United States Patent [19]
Piiroya et al.

[11] 3,880,785
[45] Apr. 29, 1975

[54] STENCIL-PRINT COLOUR

[76] Inventors: Eduard Karlovich Piiroya, Bulvar Karla Marxa, 15, kv. 9, Tallinn, U.S.S.R.; Mati Endel-Agustovich Pyldsaar, ul. Sovetskaya 7, kv. 78, Ivanovo, U.S.S.R.; Anti Kheldurovich Viikna, ul. Tatari 15, kv. 8, Tallinn, U.S.S.R.

[22] Filed: Dec. 27, 1973

[21] Appl. No.: 428,862

Related U.S. Application Data
[63] Continuation-in-part of Ser. No. 378,902, July 13, 1973, abandoned, which is a continuation of Ser. No. 212,670, Dec. 27, 1971, abandoned.

[52] U.S. Cl. ................ 260/22 S; 106/28; 106/32; 117/38; 117/161 K; 260/19; 260/20; 260/32.85 B; 260/33.65 B; 260/33.25 B; 260/DIG. 38
[51] Int. Cl. ........................................... C09d 11/10
[58] Field of Search ......... 260/22 S, 46.5 R, 19, 20; 117/38

[56] References Cited
UNITED STATES PATENTS

| | | | |
|---|---|---|---|
| 2,587,295 | 2/1952 | Doyle et al. | 260/22 |
| 2,679,491 | 5/1954 | Kennedy et al. | 260/22 |
| 2,877,202 | 3/1959 | Olson | 260/22 |
| 3,330,684 | 7/1967 | Wheeler | 117/38 |

*Primary Examiner*—Ronald W. Griffin
*Attorney, Agent, or Firm*—Holman & Stern

[57] ABSTRACT

A stencil-print colour comprising a linseed varnish which is essentially polymerized linseed oil, or pentaphthalic varnish which is polypentaerythritolphthalate modified by linseed, tung, or castor oil and dissolved in said oil; or glyptal varnish which is polyglycerol-phthalate modifed by linseed, tung, or castor oil and dissolved in said oil; or a mixture of said varnishes; a resin selected from phenol-formaldehyde resins or from those modified by colophony; metal salts of higher carboxylic acids having more than six carbon atoms; pigments, an organic solvent and a mixture of polymethylspirocyclosiloxanes of the following formula:

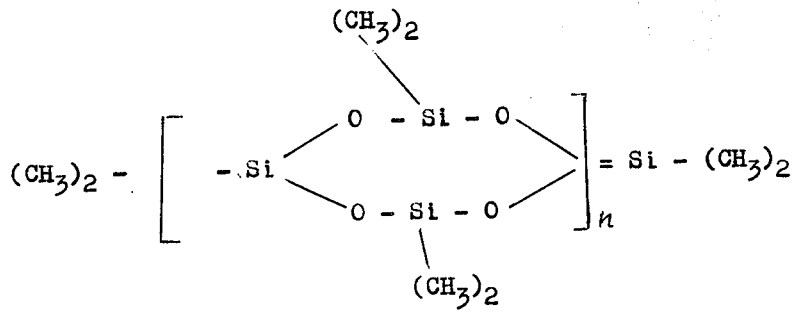

wherein $n=2$ to 7 with an average molecular weight ranging from 800 to 1,500; the components of the colour being taken in the proportions as follows (parts by weight):

| | |
|---|---|
| varnishes | 100 |
| resin | 75–125 |
| metal salts of higher carboxylic acids | 2–25 |
| pigments | 5–120 |
| organic solvent | 75–175 |
| mixture of polymethylspirocyclosiloxanes | 1–20. |

The stencil-print colour of the present invention features a good homogeneity and elasticity. It does not fill the screen stencil when used for printing at both high and low speeds. With the use of this colour high-quality prints and painted articles are obtained.

14 Claims, No Drawings

STENCIL-PRINT COLOUR

This application is a continuation-in-part of co-pending application Ser. No. 378,902, filed July 13, 1973, now abandoned, which in turn was a Rule 60 continuation of Ser. No. 212,670, filed Dec. 27, 1971, now abandoned.

The present invention relates to stencil-print colours used in printing on polymer materials, glass, metal, regenerated cellulose (cellophane) and the like, as well as for painting the surface of said materials.

Known in the art heretofore are stencil-print colours incorporating linseed-oil varnish which is polymerized linseed oil, or pentaphthalic varnish which is essentially polypentaerythritol-phthalate modified by a vegetable oil (such as linseed oil, tung or castor oil) and dissolved in said oil; or glyptal varnish which is essentially polyglycerol-phathalate modified by a vegetable oil (linseed, tung or castor oil) and dissolved in said oil; or a mixture of said varnishes; a resin selected from phenol-formaldehyde resins or those modified by colophony; metal salts of higher carboxylic acids having more than six carbon atoms; pigments and an organic solvent.

Also known in the art are stencil-print colours comprising a solution of various resins, preferably low-molecular polyamides, in highly volatile organic solvents, and pigments.

The prior-art colours of the former type have a prolonged drying time (20 to 30 minutes at 60°C), wherefore they are not suitable for use in printing machines. Moreover, said colours are liable to formation of supramolecular structures upon drying, wherefore off-quality prints having a brittle film colour layer are obtained.

The prior-art colours of the latter type are liable to fill the screen stencil when used in printing presses with an output of below 4,000 prints per hour. When used in high-speed printing machines with an output exceeding 4,000 prints per hour, said colours result in off-quality prints with a brittle film colour layer.

It is an object of the present invention to provide a stencil-print colour possessing good homogeneity and elasticity.

It is another object of the present invention to provide such a stencil-print colour which would not fill the screen stencil when used at both high and low printing speeds.

In accordance with these and other objects, the present invention resides in the provision of a stencil-print colour comprising a varnish (1) selected from the group consisting of linseed-oil varnish which is essentially polymerized linseed oil, pentaphthalic varnish which is polypentaerythritolphthalate modified by a vegetable oil (linseed oil, tung or castor oil) and dissolved in said oil, glyptal varnish which is essentially polyglycerol-phthalate modified by a vegetable oil (linseed oil, tung or castor oil) and dissolved in said oil, or a mixture of said varnishes; a resin (2) selected from phenol-formaldehyde resins or from those modified by colophony; metal salts (3) of higher carboxylic acids having more than six carbon atoms; pigments (4); and an organic solvent (5) and a mixture of polymethyl-spirocyclosiloxanes (6) of the following formula:

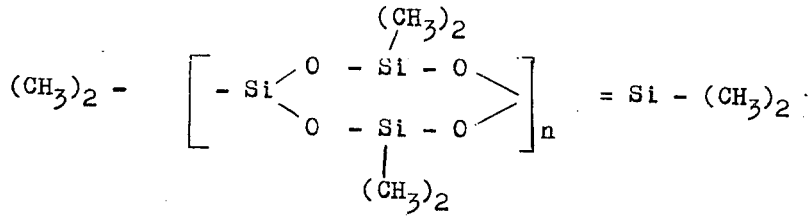

where $n = 2$ to $7$, with an average molecular weight ranging from 800 to 1,500; the colour components being taken in the following proportions (parts by weight):

| | |
|---|---|
| varnishes (1) | 100 |
| resin (2) | 75–125 |
| metal salts (3) of higher carboxylic acids | 2–25 |
| pigments (4) | 5 to 120 |
| organic solvent (5) | 75–175 |
| mixture of polymethylspirocyclosiloxanes (6) | 1–20 |

According to the present invention, the mixture of polymethylspirocyclosiloxanes is added to the colour to preclude the formation of supramolecular structures, improve homogeneity and elasticity of the colour, increase its brightness, as well as to enhance wettability of printing materials, e.g. polyethylene, by the colour. The introduction of said polysiloxane additive makes it possible to make a full use of the colour components in their optimal proportions ensuring the effect of rapid drying of the colour. With the use of such a stencil-print colour, the filling of the screen stencil therewith in printing on high-speed machines with an output of about 5,000–6,000 prints per hour is completely avoided.

The stencil-print colour of the present invention may incorporate, as the above resins, such high-molecular compounds as, for example, diphenylolpropane-formaldehyde resin modified by colophony, phenol-formaldehyde resin, and cresol-formaldehyde resin.

As the metal salts of higher carboxylic acids, the stencil-print colour of the present invention may contain, for example, resinates, linoleates, naphthenates of calcium, manganese, lead, cobalt, aluminium (both as an individual salt and various mixtures of individual salts).

As the pigments, the stencil-print colour of the present invention may incorporate organic or inorganic pigments and mixture thereof.

As the organic solvents, the stencil-print colour of the present invention may comprise such solvents as toluene, ethylacetate, butylacetate, cyclohexanone, ethylene-glycol monoethylate (Ethylcellosolve) ethylene-glycol mono-n. butylate (Butylcellosolve) or mixtures thereof.

To preclude filling of the screen stencil by the colour during printing on high-speed printing machines (with an output ranging from 3,000 to 5,000 prints per hour), it is advisable to use, in accordance with the present invention, a colour incorporating also tetrahydronaphthalene, decahydronaphthalene, methylcyclohexanol or mixtures thereof in an amount ranging from 1 to 10 parts by weight per 100 parts by weight of the varnishes used.

The introduction of said compounds into the stencil-print colour of the present invention precludes its premature drying on the screen stencil during the printing process, while not affecting the colour drying rate at the stage of prints drying (at a temperature of about 60°C).

To prevent the screen stencil from filling with the colour during printing on machines with an output within the range of from 500 to 3,000 prints per hour or on manually-operated printing presses with an output of 15 to 30 prints per hour, it is advisable, in accordance with the present invention, to use a stencil-print colour which is incorporated with pentaphthalic varnish comprising polypentaerythritol-phthalate modified by linseed-oil and dissolved in said oil in an amount ranging from 5 to 50 parts by weight per 100 parts by weight of the varnishes contained in the colour.

The introduction of the above-mentioned varnish into the stencil-print colour of the present invention precludes its premature drying on the screen stencil during printing on machines and presses with a small output.

To ensure a better sharpness of an imprint on a substrate, the colour may be incorporayed with a filler, viz. aluminium hydroxide or its mixture with barium sulphate in an amount of from 1 to 50 parts by weight per 100 parts by weight of the varnishes employed.

The stencil-print colour of the present invention features a high adherence to the surface of metal, glass, polymer materials and the like. The surface of polyethylene and polypropylene materials, prior to printing or painting, must be activated by treating thereof with gas flame, chemicals or by using corona discharge.

When dried, the colour film is elastic, wear-resistant; it has a good brightness and chemical resistance (including resistance against surface-active agents); it is not liable to ageing when exposed to UV-radiation.

The stencil-print colour according to the present invention is prepared in the following manner.

There is prepared a 50% solution of a resin selected from phenol-formaldehyde resins or from those modified by colophony in one of the above-mentioned organic solvents or in one of the mixtures thereof. Thereafter, the resin solution is added with the remaining components of the above-specified formulation (except the metal salts of higher carboxylic acids and the mixture of polymethylspirocyclosiloxanes); the mixture is charged into an attrition mill, a bead mill or a vibrating mill to be particulated therein to a fineness of 5 to 10 mcm (Composition 1).

The metal salts of higher carboxylic acids and the mixture of polymethylspirocyclosiloxanes of the afore-given generic formula are also mixed up in the proportions specified in the above-mentioned formulation to give Composition 2.

Prior to use (printing or painting of articles), the compositions thus prepared are blended and thoroughly intermixed to yield a stencil-print colour. Before being intermixed, said compositions (1 and 2) may be stored for a long period (above one year) with their properties remaining unchanged.

When appropriat, the final stencil-print colour may be added with a solvent to bring the colour to a desirable working consistency. In addition, when drying time is to be increased, the ready colour is incorporated, as has been mentioned hereinbefore, with pentaphthalic varnish which is essentially polypentaerythritol-phthalate modified by linseed oil and dissolved in said oil.

In case of using colour mills, the colour preparation technique somewhat differs from the above-described. In this case, the pigment and filler (if prescribed in the colour formulation) along with the varnishes are particulated in a colour mill to a required degree of fineness (5 to 10 mcm) to give a pigment paste. At the same time, a 50–60% solution of the resin in one of the aforesaid organic solvents or in a mixture thereof is prepared. Then, to prepare Composition 1, said pigment paste is mixed with the resin solution and with such components as tetrahydronaphthalene, decahydronaphthalene methylcyclohexanol or their mixtures, if prescribed in the colour formulation.

The metal salts of higher carboxylic acids and the mixture of polymethylspirocyclosiloxanes of the above-mentioned generic formula are intermixed to give Composition 2.

Prior to use, the thus prepared compositions are blended and thoroughly intermixed to give the final stencil-print colour.

For a better understanding of the present invention the following specific examples of the stencil-print colour are given hereinbelow by way of illustration.

EXAMPLE 1

29 kg of pentaphthalic varnish (polypentaerythritol-phthalate modified by linseed oil and dissolved therein) and 60 kg of a 50% solution of diphenylolpropane-formaldehyde resin modified by colophony are mixed in a mixture of solvents consisting of 13 kg of cyclohexanone, 8.5 kg of toluene, and 8.5 kg of ethylacetate with 17 kg of red organic pigment, 0.5 kg of tetrahydronaphthalene, and 3.5 kg of a mixture of aluminium hydroxide and barium sulphate (in a weight ratio between aluminium hydroxide and barium sulphate of 1:2). The resulting mixture is charged into an attrition mill and desintegrated therein to a fineness of 5 and 10 mcm (Composition 1).

Said pentaphthalic varnish has been preliminary prepared in the following manner. To 750 kg of linseed oil were added 142 kg of pentaerythritol and 35 kg of lead oxide and the resulting mixture was heated at a temperature of 250°–260°C for 6 hours. Then the mixture was added with 245 kg of phthalic acid anhydride, 0.5 kg of triphenyl phosphite, 50 kg of xylene and the reaction mixture was heated at a temperature of 225°–230°C for 8 hours, whereafter the xylene was distilled off in vacuum.

Said diphenylolpropane-formaldehyde resin modified by colopheny has been preliminary produced in the following manner. 240 kg of diphenylolpropane, 50 kg of paraform, 200 kg of a 36% formaldehyde solution and 1.5 kg of calcium hydroxide were charged into a reactor; the reaction mixture was heated to 40°C, whereafter the heating was discontinued and the reaction mixture was maintained at a temperature of from 40 to 50°C for 4 hours. Then 1,500 kg of molten colophony preliminary exempted from terpenes by steam-distillation were charged into the reactor; the mixture temperature was elevated to 170°–180°C and the mixture was maintained at this temperature for 4 hours. Then 90 kg of glycerol were added, the mixture temperature was elevated to 240°C and the reaction mixture was allowed to stay at this temperature for 2–2.5 hours. The thus prepared high-molecular compound (resin) has the following structural formula:

[Chemical structure diagram showing a complex molecule with HOOC, CH₃, CH₂, O, CH₂OH, and other functional groups]

Along with Composition 1 mentioned hereinabove, Composition 2 was prepared by way of mixing, in a separate vessel, 1.5 kg of cobalt naphthenate, 1.5 kg of a mixture of calcium, manganese, and lead linoleates (in the weight ratio of 1:1:1) and 3 kg of a mixture of polymethylspirocyclosiloxanes.

Said mixture of polymethylspirocyclosiloxanes has been preliminary prepared in the following manner. 140 kg of water, 30 kg of n-butanol, and 18 kg of toluene or xylene were charged into a reactor. Then, a solution of 28.4 kg of dimethyldichlorosilane and 12.4 kg of silicon tetrachloride in 18 kg of toluene or xylene was slowly added to the reaction mixture under vigourous stirring. The resulting mixture was stirred in the reactor for additional 1–2 hours, whereafter the reactor contents was allowed to stratify into two layers. The lower aqueous layer was discharged, while the upper layer comprising a solution of the desired product in organic solvents was washed with water until a neutral reaction was obtained, whereafter the solvents (n-butanol and toluene or xylene) were distilled off in vacuum. The desired product (bottom residue) was not resolved into individual compounds but used as it was, i.e. in the form of the final product comprising a mixture of polymethylspirocyclosiloxanes of the formula:

[Chemical structure of polymethylspirocyclosiloxane formula with $(CH_3)_2$ groups and Si-O linkages, with subscript n]

where $n=2$ to 7, with an average molecular weight ranging from 800 to 1,500.

Prior to printing, both composition 1 and Composition II were intermixed to give a stencil-print colour which had complete drying time as follows:

| at 18–20°C | 40 to 60 minutes |
| at 60°C | 2 to 4 minutes |
| at 90°C | 1 to 2 minutes. |

Using this colour, printing may be effected on machines with an output rainging from 3,000 to 6,000 prints per hour without filling the screen stencil with the colour.

A stencil-print colour prepared in the above-described manner but without incorporating tetrahydronaphthalene into its composition had the following complete drying time:

| at 18–20°C | 10 to 15 minutes |
| at 60°C | 2 to 4 minutes |
| at 90°C | 1 to 2 minutes. |

Using this colour, printing may be effected only on highspeed machines with an output of 5,000–6,000 prints per hour.

For printing on machines with an output of from 500 to 3,000 prints per hour as well as on manually-operated printing presses with an output of 15 to 30 prints per hour without filling of the screen stencil, into the prepared colour (both containing tetrahydronaphthalene and without it) pentaphthalic varnish was added comprising polypentaerythritol-phthalate modified by linseed oil and dissolved therein.

The effect of said pentaphthalic varnish added to the stencil print colour on the complete drying time thereof is evident from the following Table.

Table

| Amount of pentaphthalic varnish as percentage of the colour weight | Complete drying time of colour, minutes | |
| --- | --- | --- |
| | at 18–20°C | at 60°C |
| 2.5 | 150–180 | 8–10 |
| 5 | 300–360 | 14–15 |
| 7.5 | 600–720 | 22–23 |
| 10 | 900–1,080 | 28–30 |

With the use of the thus-prepared colour there were obtained high-quality prints and painted articles. The colour did not form supramolecular structures during the drying process. The dried colour film is elastic; it is not liable to ageing upon prolonged storage in the air or upon exposure to UV-radiation.

EXAMPLE 2

24 kg of pentaphthalic varnish prepared in a manner similar to that described in Example 1, 1.7 kg of linseed-oil varnish (polymerized linseed oil of a low polymerization degree) 60 kg of a 50% solution of diphenylolpropane-formaldehyde resin modified by colophony and prepared as in Example 1 were intermixed in a mixture of solvents consisting of 10 kg of cyclohexanone and 20 kg of toluene with 4 kg of an inorganic blue pigment, 1.5 kg of carbon black, 0.8 kg of an organic black pigment, 6 kg of aluminium hydroxide, and 4 kg of barium sulphate. The mixture was charged into a bead mill and desintegrated therein to a fineness of about 5 to 10 mcm (Composition 1). In a separate vessel there was prepared Composition 2 by way of mixing 1.5 kg of cobalt naphthenate, 2 kg of lead resinate, 2 kg of manganese resinate, and 6 kg of the mixture of polymethylspirocyclosiloxanes prepared as in Example 1.

Prior to the use, both compositions (1 and 2) were mixed and added with additional 5 kg of toluene to give a ready-to-use stencil-print colour.

The properties of the colour thus prepared were similar to those of the colour as prepared in Example 1.

EXAMPLE 3

24 kg of glyptal varnish (polyglycerol-phthalate modified by tung oil and dissolved therein) and 25 kg of titanium dioxide were mixed and then desintegrated in a colour mill to a fineness of 5 to 10 mcm. Then, the pigment paste thus prepared was mixed with 50 kg of a solution of diphenylolpropane-formaldehyde resin (25 kg of the resin and 25 kg of ethylene-glycol monoethylate) and 0.3 kg of methylcyclohexanol (Composition 1). Composition 2 was prepared separately by way of mixing 2 kg of lead resinate, 0.2 kg of manganese linoleate, 0.25 kg of calcium linoleate, and 2 kg of the mixture of polymethylspirocyclosiloxanes as prepared in Example 1.

Prior to the use, both compositions were mixed to give a ready-to-use stencil-print colour.

As to its properties, the colour thus prepared was similar to that described in Example 1.

EXAMPLE 4

31 kg of pentaphthalic varnish (polypentaerythritolphthalate modified by castor oil and dissolved therein), 60 kg of a solution of phenol-formaldehyde resin (30 kg of the resin and 30 kg of ethylene-glycol mono-n.butylate) were mixed with 0.2 kg of tetrahydronaphthalene, 0.2 kg of decahydronaphthalene, 10 kg of an inorganic blue pigment and 2 kg of aluminium hydroxide. The mixture was charged into a vibrating mill and desintegrated therein to a fineness of about 5 to 10 mcm (Composition 1).

The above-mentioned resin has been obtained from phenol and formaldehyde at their molar ratio of 8:7 respectively by polycondensation in an acidic medium.

Composition 2 was separately prepared by way of mixing 7 kg of aluminium linoleate and 0.5 kg of the mixture of polymethylspirocyclosiloxanes prepared as in Example 1.

Prior to the use, both compositions were mixed to give a ready-to-use stencil-print colour.

As to its properties, the colour thus prepared was similar to that described in Example 1.

EXAMPLE 5

15 kg of pentaphthalic varnish (polypentaerythritolphthalate modified by tung oil and dissolved therein), 15 kg of glyptal varnish (polyglycerol-phthalate modified by linseed oil and dissolved therein), 60 kg of a solution of cresolformaldehyde resin (30 kg of the resin, 20 kg of butylacetate and 10 kg of cyclohexanone) were mixed with 2.5 kg of decahydronaphthalene, 3 kg of an organic yellow pigment and 10 kg of aluminium hydroxide. The mixture was changed into an attrition mill and desintegrated therein to a fineness of 5 to 10 mcm (Composition 1). Composition 2 was separately prepared by way of mixing 1.5 kg of cobalt naphthenate, 1.5 kg of lead resinate and 3 kg of the mixture of polymethylspirocyclosiloxanes prepared as in Example 1.

Prior to the use both compositions were intermixed to give a stencil-print colour which had properties similar to those of the colour prepared in Example 1.

What is claimed is:

1. A stencil-print colour which comprises a varnish (1) selected from the group consisting of linseed varnish which is essentially polymerized linseed oil, pentaphthalic varnish which is essentially polypentaerythritolphthalate modified by a vegetable oil and dissolved therein, polyglycerol-phthalate modified with a vegetable oil and dissolved therein, and a mixture of the above-mentioned varnishes; a resin (2) selected from the group consisting of phenol-formaldehyde resins and colophony-modified phenol-formaldehyde resins; metal salts (3) of higher carboxylic acids having more than six carbon atoms; pigments (4); an organic solvent (5); and a mixture of polymethylspirocyclosiloxanes (6) of the formula:

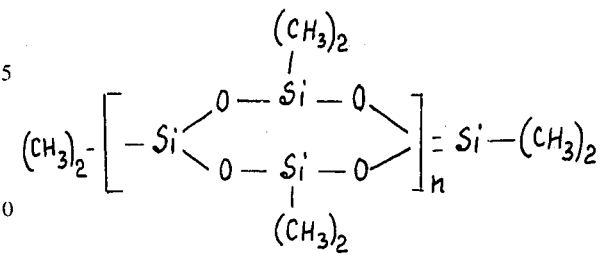

where $n = 2$ to 7, with an average molecular weight of from 800 to 1,500; the colour components being taken in the following proportions (parts by weight):

| | |
|---|---|
| varnishes (1) | 100 |
| resin (2) | 75–125 |
| metal salts (3) of higher carboxylic acids | 2–25 |
| pigments (4) | 5–120 |
| organic solvent (5) | 75–175 |
| mixture of polymethylspirocyclosiloxanes (6) | 1–20. |

2. A stencil-print colour as claimed in claim 1, wherein said varnish is pentaphthalic varnish which is essentially polypentaerythritolphthalate modified by a vegetable oil selected from the group consisting of linseed oil, tung and castor oil, and dissolved in said oil.

3. A stencil-print colour as claimed in claim 1, wherein said varnish is polyglycerol-phthalate modified by a vegetable oil selected from the group consisting of linseed oil, tung and castor oil, and dissolved in said oil.

4. A stencil-print colour as claimed in claim 1, wherein said resin is a high-molecular compound selected from the group consisting of diphenylolpropane-formaldehyde resin, colophony-modified diphenylolpropane-formaldehyde resin, phenol-formaldehyde resin and cresol-formaldehyde resin.

5. A stencil-print colour as claimed in claim 1, wherein said metal salts of higher carboxylic acids having more than six carbon atoms are salts selected from the group consisting of resinates, linoleates and naphthenates of calcium, manganese, lead, cobalt aluminium and mixtures thereof.

6. A stencil-print colour as claimed in claim 1, wherein said pigments are selected from the group consisting of organic and inorganic pigments and mixtures thereof.

7. A stencil-print colour as claimed in claim 1, wherein said organic solvent is selected from the group consisting of toluene, ethylacetate, butylacetate, cyclohexanone, ethylene-glycol monoethylate, ethylene-glycol mono-n.butylate and mixtures thereof.

8. A stencil-print colour as claimed in claim 1, further including a compound selected from the group consisting of tetrahydronaphthalene, decahydronaphthalene, methylcyclohexanol and mixtures of said compounds in an amount of from 1 to 10 parts by weight per 100 parts by weight of the varnishes used.

9. A stencil-print colour as claimed in claim 1, which further includes pentaphthalic varnish which is essentially polypentaerythritol-phthalate modified by linseed oil and dissolved in said oil in an amount of from 5 to 50 parts by weight per 100 parts by weight of the varnishes contained in the colour.

10. A stencil-print colour as claimed in claim 8, which further includes pentaphthalic varnish which is essentially polypentaerythritol-phthalate modified by linseed oil and dissolved in said oil in an amount of from 5 to 50 parts by weight per 100 parts by weight of the varnishes contained in the colour.

11. A stencil-print colour as claimed in claim 1, which further includes a filler selected from the group consisting of aluminium hydroxide and its mixture with barium sulphate in an amount of from 1 to 50 parts by weight per 100 parts by weight of the varnishes used.

12. A stencil-print colour as claimed in claim 8, which further includes a filler selected from the group consisting of aluminium hydroxide and its mixture with barium sulphate in an amount of from 1 to 50 parts by weight per 100 parts by weight of the varnishes used.

13. A stencil-print colour as claimed in claim 9, which further includes a filler selected from the group consisting of aluminium hydroxide and its mixture with barium sulphate in an amount of from 1 to 50 parts by weight per 100 parts by weight of the varnishes used.

14. A stencil-print colour as claimed in claim 10, which further includes a filler selected from the group consisting of aluminium hydroxide and its mixture with barium sulphate in an amount of from 1 to 50 parts by weight per 100 parts by weight of the varnishes used.

* * * * *